(12) United States Patent
De et al.

(10) Patent No.: US 12,350,837 B2
(45) Date of Patent: Jul. 8, 2025

(54) METHOD TO IMPROVE WALKING PERFORMANCE OF QUADRUPEDS OVER SOFT SURFACES

(71) Applicant: Ghost Robotics Corporation, Philadelphia, PA (US)

(72) Inventors: Avik De, Philadelphia, PA (US); Jeffrey Duperret, Philadelphia, PA (US)

(73) Assignee: Ghost Robotics Corp., Philadelphia, PA (US)

( * ) Notice: Subject to any disclaimer, the term of this patent is extended or adjusted under 35 U.S.C. 154(b) by 99 days.

(21) Appl. No.: 18/230,716

(22) Filed: Aug. 7, 2023

(65) Prior Publication Data

US 2024/0042604 A1 Feb. 8, 2024

Related U.S. Application Data

(60) Provisional application No. 63/395,420, filed on Aug. 5, 2022.

(51) Int. Cl.
 *B25J 13/08* (2006.01)
 *B25J 9/16* (2006.01)
 *B62D 57/032* (2006.01)

(52) U.S. Cl.
 CPC ............ *B25J 9/1653* (2013.01); *B25J 13/08* (2013.01)

(58) Field of Classification Search
 CPC ........ B25J 9/1653; B25J 13/08; B62D 57/032
 See application file for complete search history.

(56) References Cited

U.S. PATENT DOCUMENTS

| | | |
|---|---|---|
| 9,387,896 B1* | 7/2016 | Blankespoor ........ B62D 57/032 |
| 2005/0067993 A1 | 3/2005 | Kato et al. |
| 2016/0288848 A1 | 10/2016 | Hurst et al. |
| 2019/0307583 A1 | 10/2019 | Herr et al. |
| 2021/0031377 A1 | 2/2021 | Narita |
| 2022/0143828 A1 | 5/2022 | Blankespoor et al. |

(Continued)

FOREIGN PATENT DOCUMENTS

| | | |
|---|---|---|
| CN | 108674521 A | 10/2018 |
| WO | 2021182243 A1 | 9/2021 |

OTHER PUBLICATIONS

International Search Report and Written Opinion in corresponding PCT Application No. PCT/2023/029588, mailed Feb. 6, 2024.

(Continued)

*Primary Examiner* — Adam R Mott
*Assistant Examiner* — Heather J Keniry
(74) *Attorney, Agent, or Firm* — White and Williams LLP

(57) ABSTRACT

The present invention pertains to a method for a quadruped robot to navigate through granular media, such as deep sand and for providing improvements in the walking performance over various types of granular media. In particular, the present invention proposes reducing the assumed coefficient of friction about the ground, impacting the ground harder than nominal in the vertical direction at touchdown, and forcing a toe lift off into swing if a knee joint extends beyond a threshold stance to help increase the robustness of a quadruped robot's locomotive abilities on challenging terrains and provide an improvement in the field of biomechanics and robotic navigation.

4 Claims, 9 Drawing Sheets

(56) References Cited

U.S. PATENT DOCUMENTS

2022/0168897 A1* 6/2022 Xu ..................... B25J 19/026
2022/0219320 A1 7/2022 Søe-Knudsen

OTHER PUBLICATIONS

Li et al., A terradynamics of legged locomotion on granular media, science 339.6126, 2013, 1408-1412.
Wieber et al., Modeling and control of legged robots, Springer handbook of robotics, 2016, 1203-1234, Cham: Springer International Publishing.
Li et al., Sensitive dependence of the motion of a legged robot on granular media, Proceedings of the National Academy of Sciences 106.9, 2009, 3029-3034.
Choi et al., Learning quadrupedal locomotion on deformable terrain, Science Robotics 8.74, 2023, eade2256.
Brown, et al., Dynamic compaction of sand, AIP Conference Proceedings, 2007, vol. 955, No. 1, American Institute of Physics.

* cited by examiner

ANATOMY OF A QUADRUPED ROBOT

LEG STATE MACHINE

STANCE CONTROL ALGORITHM MODIFICATION
FOR IMPROVEMENT 1

IMPACT VELOCITY MODIFICATION FOR IMPROVEMENT 2

MODIFIED STATE MACHINE FOR IMPROVEMENT 3

METHOD TO IMPROVE WALKING PERFORMANCE OF QUADRUPEDS OVER SOFT SURFACES

CROSS REFERENCE TO RELATED APPLICATIONS

This application claims the benefit of U.S. Provisional Patent Application Ser. No. 63/395,420 filed on Aug. 5, 2022, the contents of which are incorporated herein by reference.

BACKGROUND OF THE INVENTION

Quadrupeds have lent their skills and abilities to humans for decades in a myriad of industries. Additionally, in the past, domestication was an essential task in creating working relationships between these animals and humans. While this interaction has delivered many positive outcomes, present-day technology has encouraged society to harness the capabilities of sentient quadrupeds and implement them into robotics, specifically legged robots. Developments and discoveries in biomechanics and biomimicry have now enabled humankind to further advance by specifically engineering and programming non-sentient quadrupeds to execute certain tasks and functions.

Legged robots are able to traverse a large variety of terrain and substrates and have a more advantageous form in comparison to their wheeled counterparts, as they do not require a continuous base of support. However, due to their mechanical build, issues still tend to arise that otherwise would not with living, breathing and sentient quadrupeds. Granular media such as deep sand and silt present a challenge to legged robots due to several factors.

A cause for concern when creating a legged robot is the walking performance over a variety of terrains and surfaces, typically due to the shape of the quadruped's legs, feet, and other walking mechanics. Because some biomechanics rely on a uniform design for movement, it can be difficult finding the right type of apparatus for locomotion, specifically in deep sand. The present invention seeks to improve the performance of quadrupeds over soft and deformable surfaces such as deep sand, loose gravel, shifting rocks, and silt.

SUMMARY OF THE INVENTION

The present invention pertains to a method of improving the walking performance of a quadruped over a soft surface. The method results in an improvement in the gait and locomotion of a quadruped over a soft surface such as, by way of example and not limitation, deep sand, and silt. According, the fluid-like nature of granular media invalidates all the models of legged locomotion typically used to develop strategies for control. It is typically assumed that legs in contact with the ground are experiencing a sticking contact mode, and this assumption does not hold true in granular media.

Quadruped robots traditionally comprise of mechanical components, which emulate animal quadrupeds, and have joints, limbs, and feet. These are the biomechanical components that help assist the quadrupeds to move and are attached to a frame and chassis to hold every individual component. Each of these parts may be connected with, by way of example and not limitation, hinges or revolute joints, ball and socket joints, linkages, gears and belts, servos, motors or actuators, including variants of actuators, such as linear actuators etc. Typically, in the art, electromagnetic motors are used. These motors are high-torque and precise actuators that help enable the movement of each leg. For some more high-powered quadrupedal biomechanisms, pneumatic or hydraulic actuators may be used.

In addition to these standard components, sensors are typically employed, and situated in a sensor panel. These can be camera and visual sensors, contact sensors, force sensors and estimators, depth sensors, LIDAR, and proximity sensors. Contact sensors may be used to help detect and determine the characteristics of the soft terrain the legged robot is going to be supported on. Force sensors and estimators may be used to measure the forces impressed upon the ground during movement and locomotion and are heavily utilized by the subject of the present invention. As an alternative to dedicated force/torque sensors, observer or estimator algorithms may be used to detect contact forces. Likewise, standard robotics also use accelerometers and gyroscopes for the purpose of relaying sensory feedback such as vibrations, movements, and changes in orientation. Feedback from these sensors can then be used for control systems which regulate motor actions for balance and mobility objectives. In addition, the sensory feedback can help with select parameters and fine-tune the algorithms for mobility for efficient locomotion through different terrain. While method of the present invention emphasizes quadruped robots, it is applicable to walking legged robots with any number of legs and it employs a number of modular improvements.

The knee and elbow bend joints are essential when helping a quadruped robot move through deep sand terrains. To remedy the issue of poor gait in soft surfaces, the process calls for a reduction in the assumed coefficient of friction about the ground, impacting the ground harder than nominal in the vertical direction at touchdown, and consequently forcing a toe to lift off into a swing state if its knee joint extends beyond the threshold in a stance. These approaches, in unison, combination or singularly, help increase the robustness of a quadrupedal leg or foot when locomoting over a granular environment or medium, such as sand, silt, etc. As mentioned before, when each of these factors are implemented and accounted for in a quadrupedal apparatus, the benefits appear cumulative.

Slipping during a stance is much more likely in granular media as the ground itself can shift under the toe. Slipping is very detrimental to the algorithms that control leg forces in stance, because the assumptions made to decide the stance leg forces are invalidated. Further, slipping can result in the leg joints extending past their nominal joint limits and approaching their allowable workspace limits. If joints approach their workspace limits, their ability to produce forces, detect forces, and absorb impact energy can all be negatively impacted. These effects can cause a robot to fall, and due to the added challenge of self-righting on soft surfaces, it may result in complete immobilization of the legged robot. By reducing the assumed coefficient of friction about the ground, the present invention helps decrease the chance of slipping.

Fluid-like characteristics of terrain depend on the packing of granular media, and impacting the ground with a higher relative velocity has the effect of compacting granular media. The benefits of this model allow more control over stance control algorithms in a legged robot because compacted sand acts more similar to solid ground than fluid; therefore, sticking contact assumptions made in the design of stance control algorithms are directly applicable. This ensures and enables greater forces to be applied in stance prior to compaction taking place, as the contact sensing method receives tactile feedback regarding the characteristics of soft surfaces and the terrains that are meant to support it.

The first improvement entails constraining ground forces. The ground reaction force has a component normal to the terrain, the normal force, and two orthogonal spatial components, the tangential force, acting tangent to the terrain. Models of static friction relate the maximum tangential force that can be supported by the terrain as proportional to the normal force. The present invention employs an algorithm to constrain the applied toe force to have a ratio of tangential and normal forces lower than the preset parameter; the improvement resides in the modification of the parameter, which entails lowering the parameter in soft surfaces, such as deep sand. This change, according to the Coulomb static friction model, is beneficial as it is less likely that the toe will slip as a result of the modification. The toe slip invalidates assumptions that are typically made by the stance control algorithm to balance a robot and ensures that the toe's contact with the ground will not be dismissed, or that it won't reach the end of its workspace. When the leg is near the end of its workspace, the leg is at a kinematic singularity since it cannot extend any further and the actuators are unable to move the limb in one or more directions in space. Furthermore, even if the desired direction of the movement of the leg is to lift it off the ground, it is highly likely that the actuators will not be able to effect this lift-off trajectory. Thus, the change in lowering the parameter in soft surfaces, and constraining the applied toe force to have a ratio of tangential and normal forces lower than the preset parameter leads to a higher likelihood of the robot lifting off without stubbing.

The second improvement comprises of modifying the typical swing trajectory of the swing legs of a robot prior to ground impact. In particular, at the end of the trajectory, the normal component of the relative velocity between the toe and the ground at the same time—also known as the touchdown velocity—must be increased relative to the nominal swing trajectory. In addition, the second improvement reduces the sensitivity of the system to contact detection errors. Some amount of displacement of the toe into the ground is required before sufficient ground reaction force is measured to cross the existing threshold. The amount of time required for the contact detection process is then this displacement divided by the impact velocity. Thus, the amount of time that elapses with the system exerting swing forces but in contact with the ground is inversely proportional to the contact velocity. In soft surfaces, the necessary displacement into the ground is relatively larger than on stiff ground; this can be justified by a simple Hookean model of the force exerted by the ground, whereby the displacement required for a fixed force is inversely proportional to the ground stiffness. Consequently, the amount of misclassified swing or stance phase time is typically larger on soft terrain than on stiff terrain. This can cause robot stability issues on soft terrain that are mitigated or counterbalanced by the present invention's improvement of increasing the impact velocity.

Due to the increased ease of slipping on these types of surfaces, there are significantly higher chances of the leg appendage of a quadruped over-extending behind the robot if the traction is lost. On the instance this occurs, the knee can extend to its singularity with detrimental effects due to the loss of a degree of freedom. To mitigate this, the present invention implements a method wherein the quadruped foot or toe can lift into a swing or swing state if its knee joint extends beyond a threshold in position during stance, thus allowing the leg to place the toe in a more favorable location in its dexterous workspace. The outcome of mitigating these effects with the processes mentioned result in the increased stability of a quadruped when locomoting over granular media, and a reduction in the chances of slipping and loss of traction.

A toe slip in a robot causes a number of issues including reaching leg workspace limits and stance as well as swing control issues, as presented previously. The third improvement entails detecting a typical slip event on soft surfaces such as sand, and a corresponding response to trigger a liftoff event in the typical leg state machine.

In the standard manifestation of a toe slip of soft surfaces, a robot attempts to accelerate forward, and one of its feet or toes slip backward. This results in the robot leg extending further than typically observed in a stance. If the robot has a revolute "knee" joint, this may result in the knee angle closer to 180 degrees, as measured between the distal link and the proximal link connected by the knee joint. If the robot has a linear joint, then this may evoke the linear joint extending a further distance than expected in a stance. In either scenario, the event can be detected by checking the joint displacement. In some embodiments, this event may automatically trigger something to notify a controller of said joint displacement. If the joint displacement passes a preset threshold greater than the expected displacement in the stance phase, the present invention's soft surface slip event is triggered.

In response to the event, the leg is moved into the swing phase. The swing phase initiates by lifting its leg off the ground, as it standardly does at the end of a stance phase. This response may cause the slipping leg and other legs to lift off before the normal time to liftoff after the completion of the stance phase, resulting in a faster step. This response avoids further displacement of the knee joint into a singular region of its configuration space. Furthermore, since the stance duration while slipping is curtailed, the robot suffers from inaccurate stance control for a more abbreviated time span. The early liftoff of the slipping legs may be accompanied by an accelerated touchdown of the previously swinging legs to maintain the previous gait contact schedule.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

The various embodiments are illustrated by way of example, and not by way of limitation, in the figures of the accompanying drawings. Having thus described the invention in general terms, reference will now be made to the accompanying drawings, which are not necessarily drawn to scale, and wherein:

DETAILED DESCRIPTION OF THE PREFERRED EMBODIMENT

Figure 1:
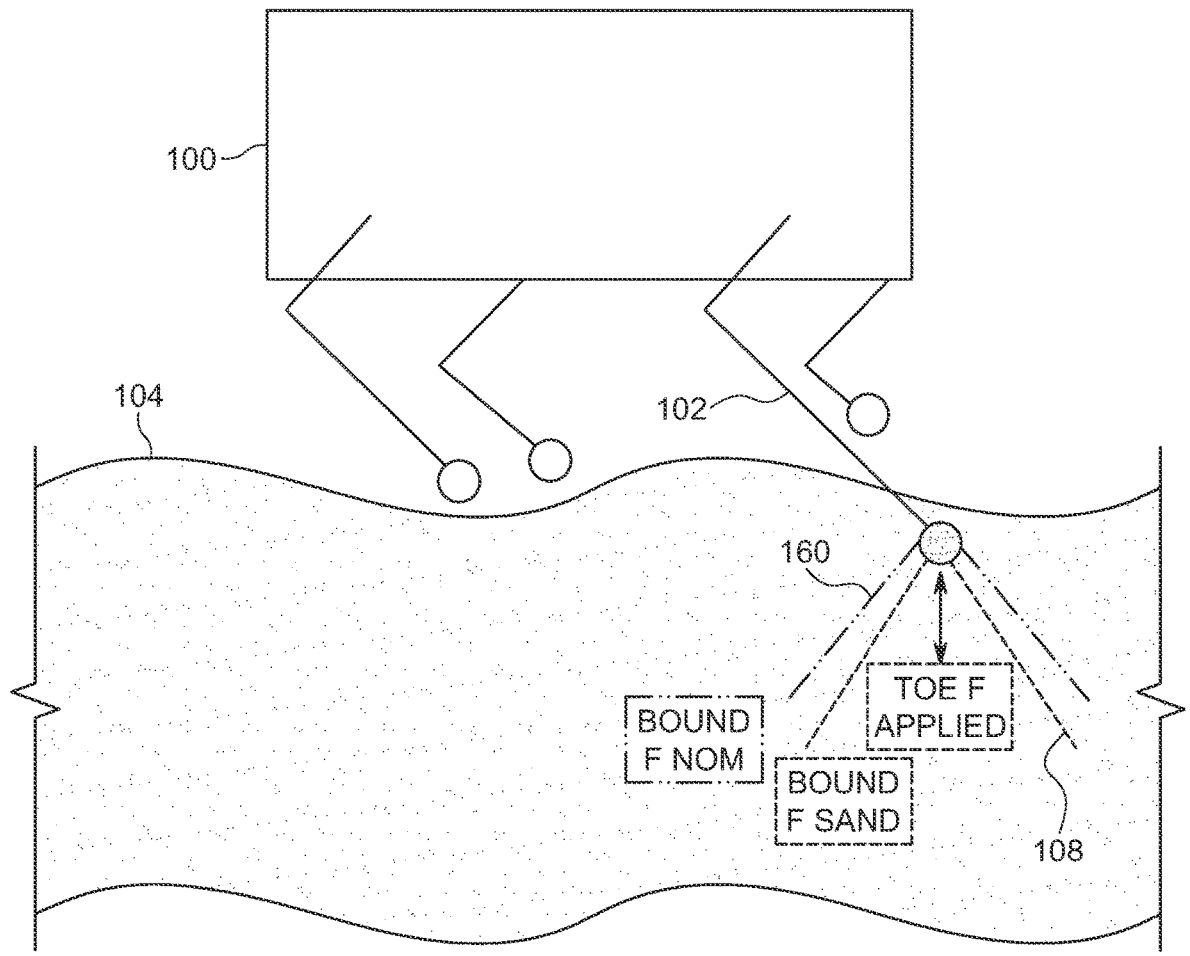
FIG. 1 is an illustration of the first strategy of the present invention implemented on a quadruped.

FIG. 1 is an illustration of one strategy of the present invention implemented on a quadruped. The solution entails decreasing the coefficient of friction of the quadruped 100 legs 102. By decreasing the coefficient of friction, the quadruped 100 has less of a tendency of falling and slipping while attempting to walk and move through sandy terrain 104. The dotted and dashed line 106 represents bound force and nominal touchdown velocity 106 whereas the dashed line 108 represents the toe of the leg 102 bound in the force of the stand. The toe of the leg 102 applies pressure to the sand 104.

Figure 2:
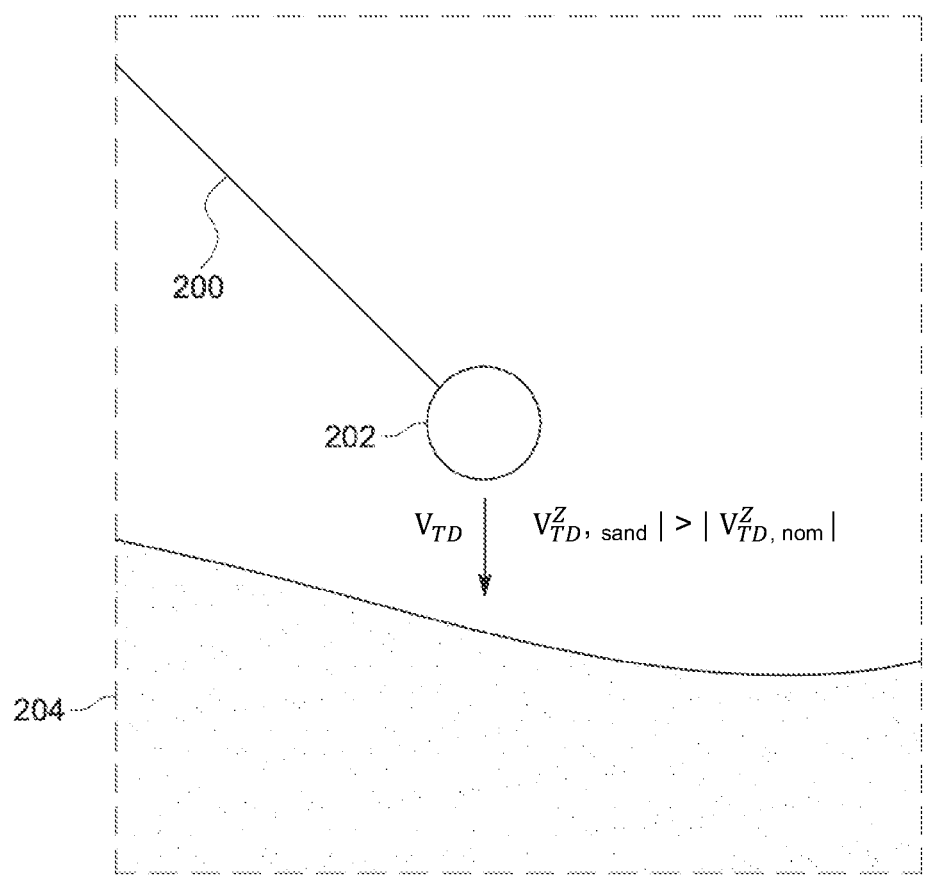
FIG. 2 is an illustration of the second strategy of the present invention implemented on a quadruped.

FIG. 2 is the second strategy of the present invention implemented on a quadruped. The leg 200 of the quadruped robot is approaching the deep sand terrain 204. The quadruped's toe which is an extension of the leg 200, using this strategy, will impact the sand terrain 204 harder than nominal in the vertical direction at touchdown, represented by the arrow.

Figure 3A:
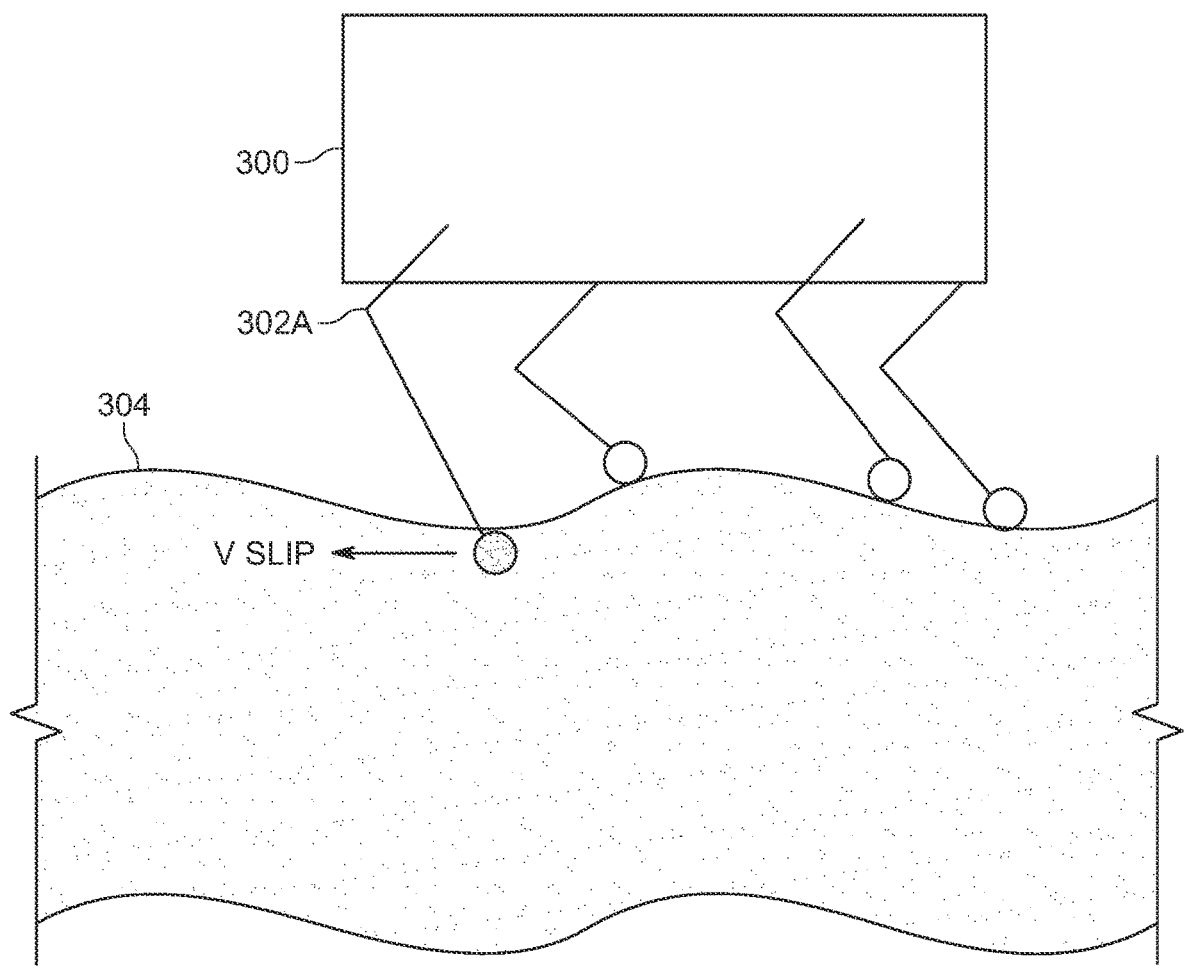
FIGS. 3A-3C present another strategy of the present invention implemented on a quadruped, this time triggered by a leg extension.
Figure 3B:
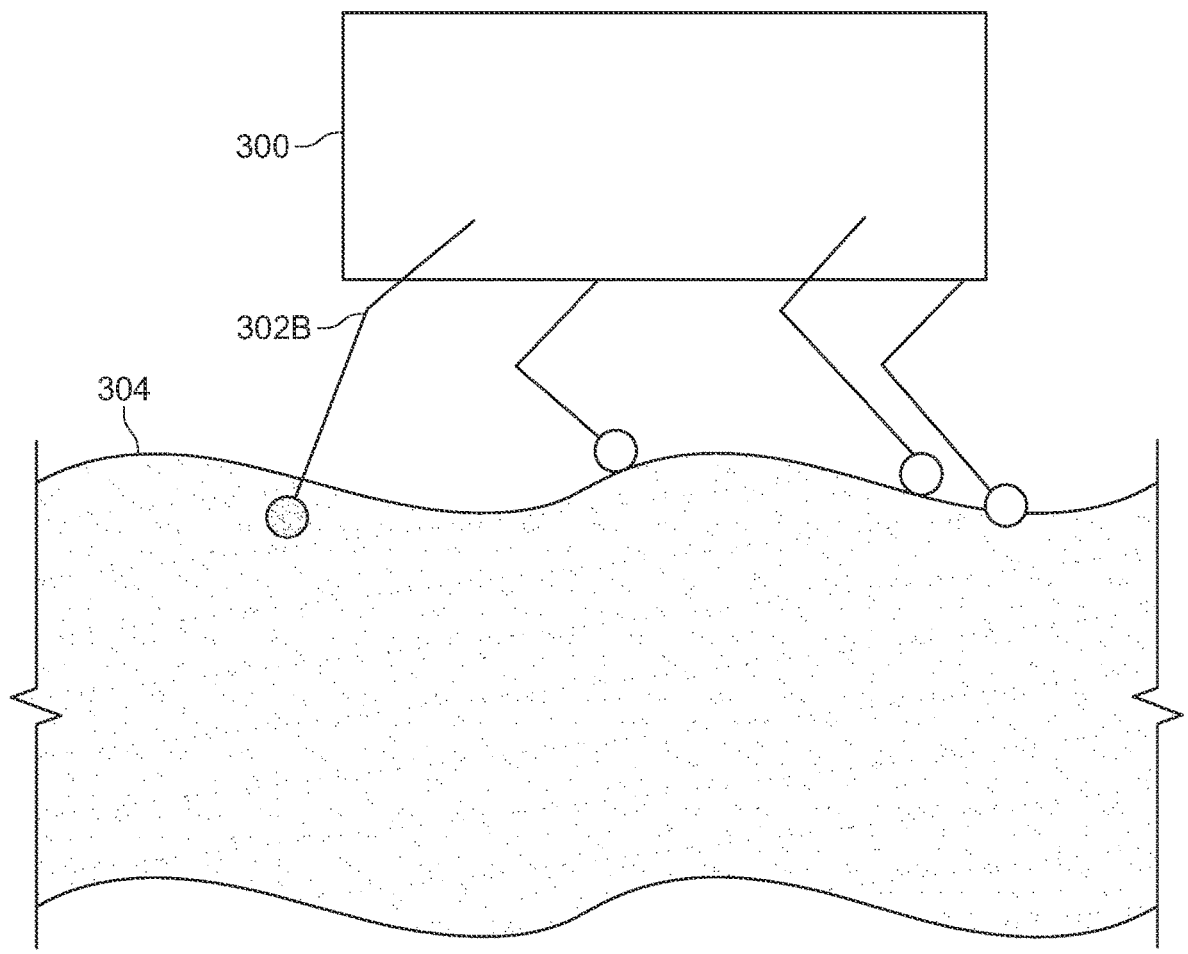
Figure 3C:
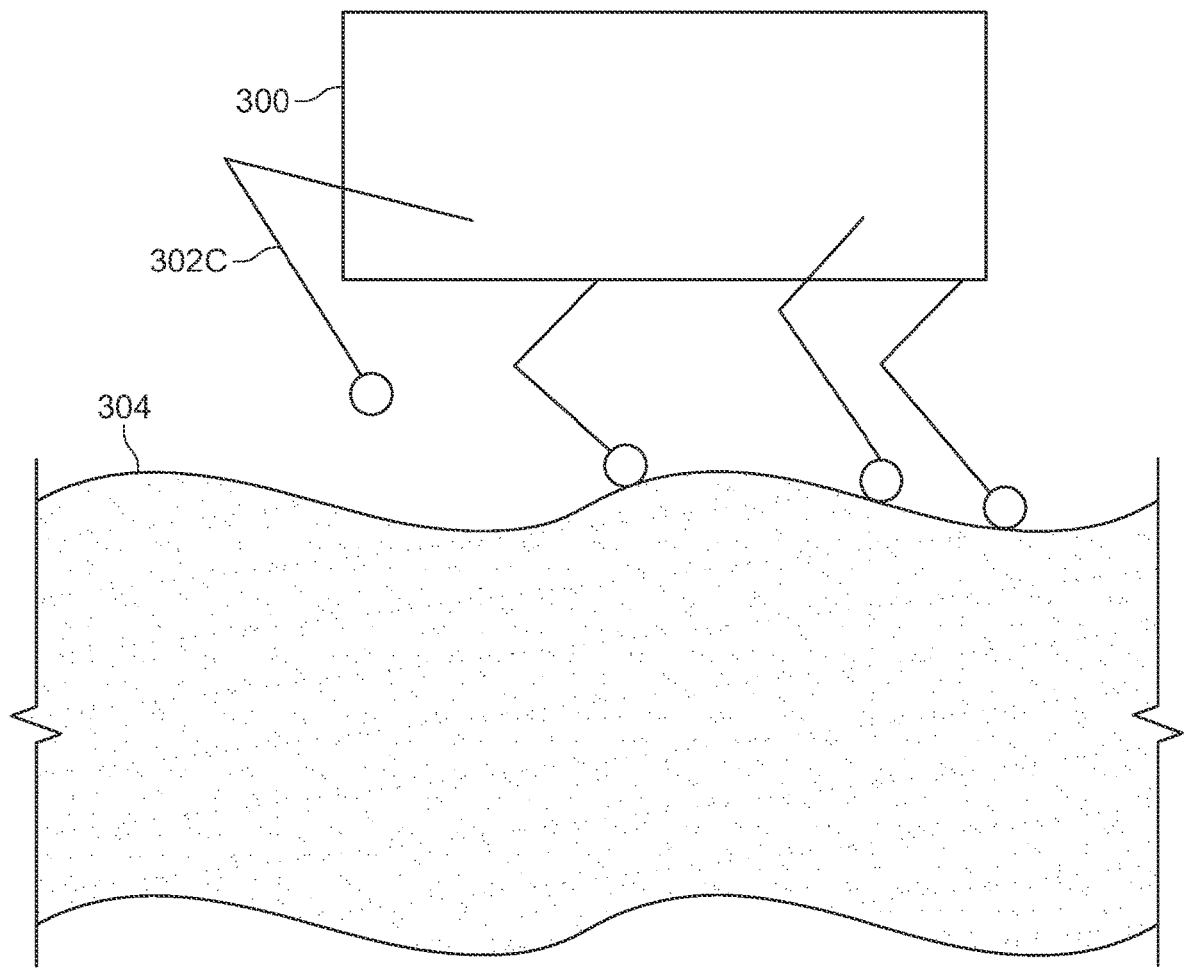

FIGS. 3A-3C present another strategy of the present invention implemented on a quadruped, this time triggered by a leg extension. This strategy is referred to as the 'liftoff upon stance leg extension'. In FIG. 3A, the quadruped 300 is stationed above sand 304. The leg 302A slips backwards in a stance. Following such, in FIG. 3B, the leg extends in the knee joint 302B. Lastly, in FIG. 3C, the extension is detected by the quadruped 300 and the leg goes into swing, or a swing state 302C.

Figure 4:
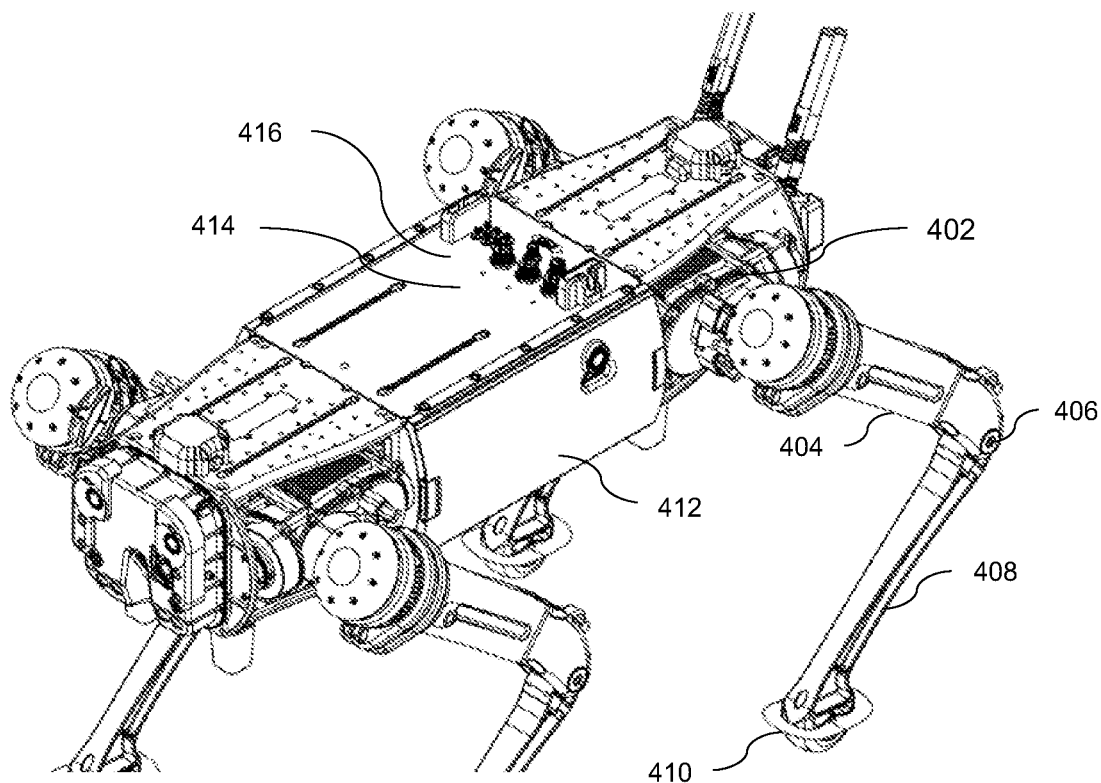
FIG. 4 are exemplary components of a quadruped robot.

FIG. 4 are components of a quadruped robot. The quadruped robot comprises of a four-legged robot with an upper limb 404, knee joint 406, a lower limb 408, and a foot or toe 410. The figure also discloses the locality of the motor drive electronics 402 which reside above the upper limb. The battery 412 is situated between the upper and lower extremities of the quadruped, and the chassis 416 houses an IMU, for, by way of example and not limitation, data processing, configuration and control.

Figure 5A:
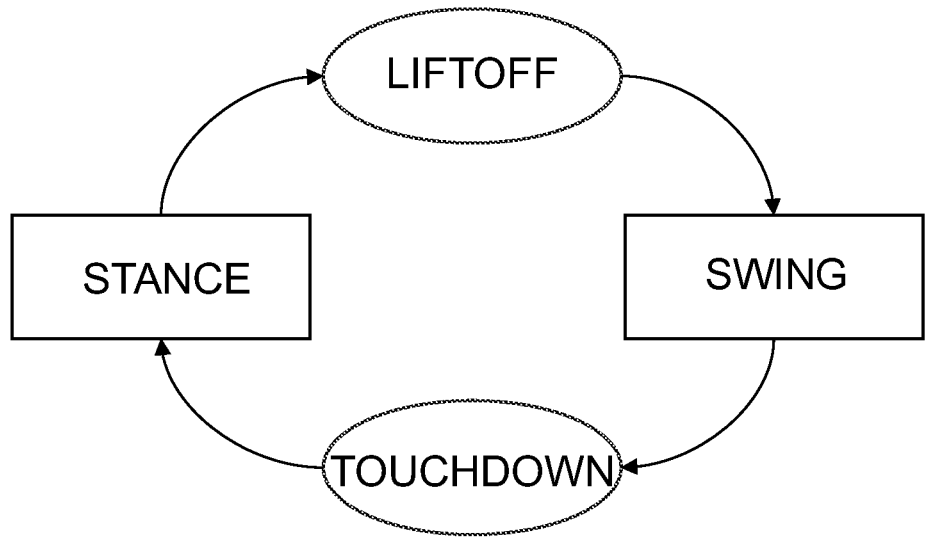
FIG. 5A is a flow chart of the leg state machine.
Figure 5B:
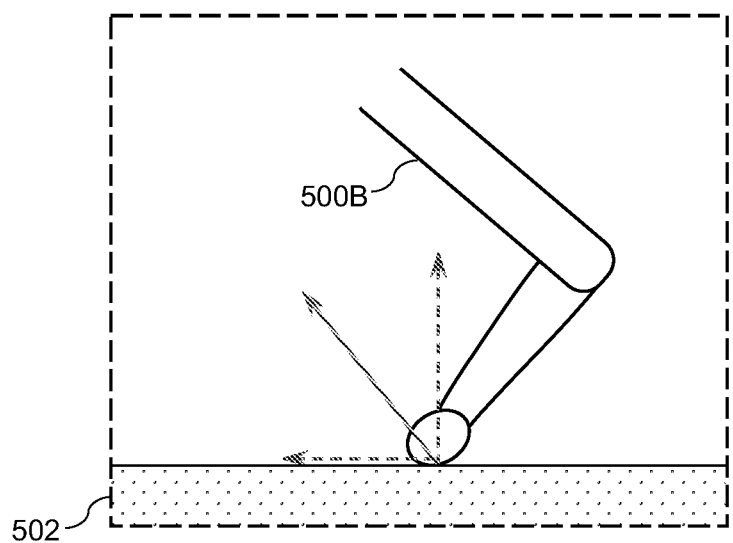
FIG. 5B is a depiction of the present invention's reaction force (diagonal arrow) and its normal (vertical arrow) and tangential (horizontal arrow) components.

FIG. 5B is a depiction of the reaction force (diagonal) and its normal (vertical) and tangential (horizontal) components in relation to a robotic limb 500B. The ground reaction force, which has a component normal to the terrain 502, the normal force, and two orthogonal spatial components, the tangential force, acting tangent to the terrain. Models of static friction relate the maximum tangential force that can be supported by the terrain as proportional to the normal force. The figure depicts the algorithm to constrain the applied toe force to have a ratio of tangential and normal forces lower than the preset parameter.

The assumption is that when a legged robot is in a stance phase in contact with the terrain 502, or in aerial or swing phase, one or more legs are in stance phase and zero or more legs are in swing phase. The legs that are in stance phase are connected to the main body of the robot by way of several actuators. The actuator outputs may be directly connected to links in the robot's leg limb 500B, or driven by linkages, but their motion ultimately results in movement of a part of the leg designated for contact with the ground (aka the toe's contact with the ground).

As the toe contacts the ground and is motion is constrained, forces or torques generated by the actuators result in forces produced at the toe, acting between the toe and the ground. Typically, the ground reaction force (equal and opposite to the applied force) will propel the robot in the desired direction.

Figure 6A:
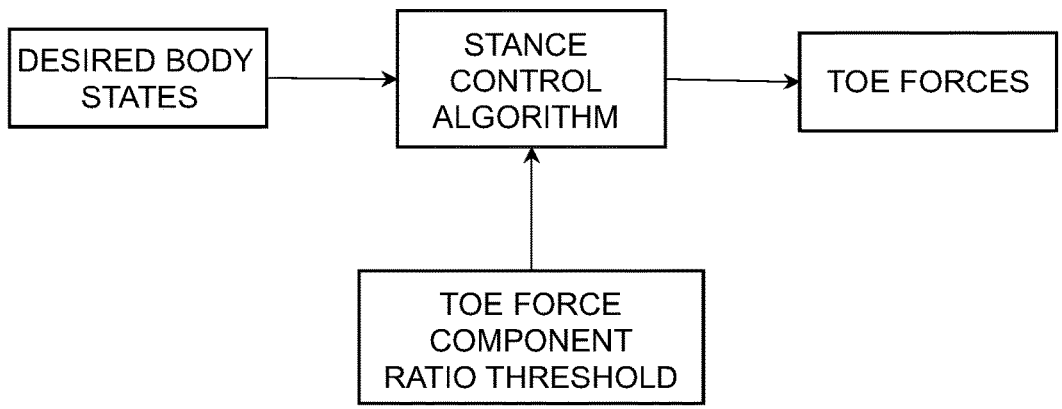
FIG. 6A is the stance control modification for the first improvement and strategy of the present invention.

FIG. 6A is the stance control modification for the first improvement and strategy of the present invention. The stance control algorithm comprises of the desired body states, toe forces and toe force component ratio thresholds. Thus, the change in lowering the parameter in soft surfaces, and constraining the applied toe force to have a ratio of tangential and normal forces lower than the preset parameter leads to a higher likelihood of the robot lifting off without stubbing.

Figure 6B:
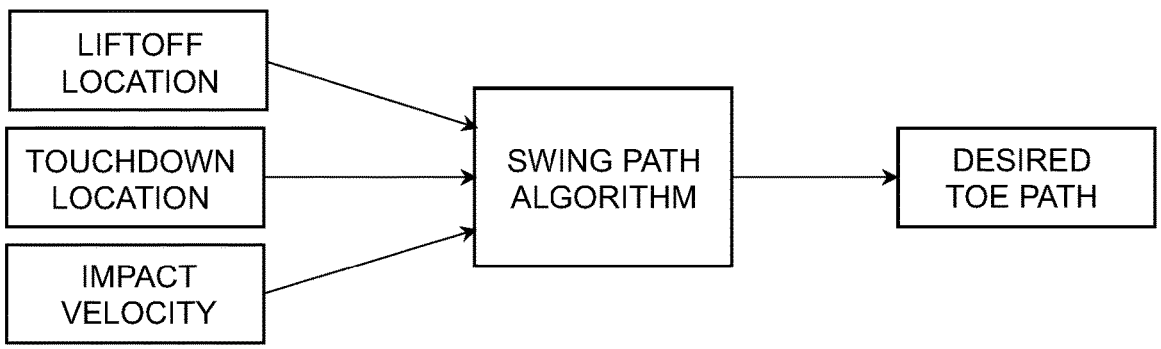
FIG. 6B is the impact velocity modification for the second improvement and strategy of the present invention.

FIG. 6B is the impact velocity modification for the second improvement and strategy of the present invention. At the end of s swing path trajectory, the normal component of the relative velocity between the toe and the ground at the same time must be increased relative to the nominal swing trajectory. The benefits of this model allow more control over stance control algorithms in a legged robot because compacted sand is more similar to solid ground as opposed to a fluid environment. The swing path algorithm comprises of a liftoff location, touchdown location and an impact velocity modification leading to a desired toe path.

Figure 7:
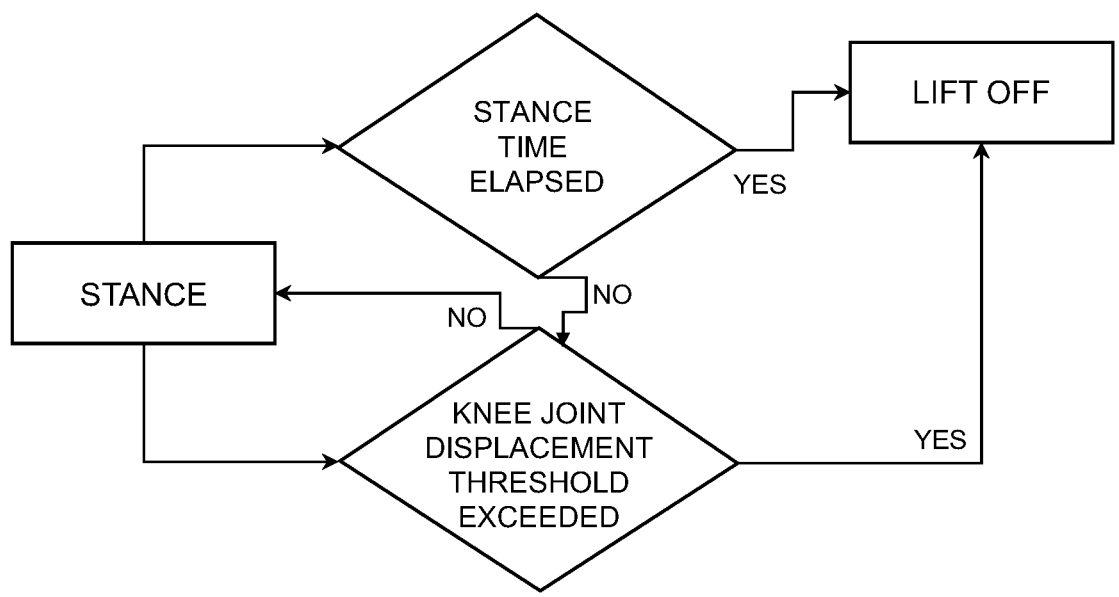
FIG. 7 is the modified state machine for the third improvement and strategy of the present invention.

FIG. 7 is the modified state machine for the third improvement and strategy of the present invention. To prevent stubbing, the present invention implements a method wherein the quadruped foot or toe can lift into a swing or swing state if its knee joint extends beyond a threshold in position during stance, thus allowing the leg to place the toe more accurately and in a favorable position for liftoff.

While various embodiments of the disclosed technology have been described above, they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical, or physical partitioning and configurations may be implemented to integrate the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A method for improving the walking performance of a legged robot over a soft surface, the method comprising of:
   executing a command for contact detection by way of a processor to determine whether characteristics of a terrain are those of a soft surface and deformable surface, or by way of a terrain recognition algorithm, or by way of an instruction from a user,
   modifying a typical swing trajectory of a legged robot's swing legs prior to ground impact over said soft surface and deformable surface,
   programming said legged robot to act in manner corresponding to said detected characteristics of said granular media by way of a contact detection algorithm, wherein said robot reacts according to a detection of primarily solid or primarily fluid-like grounds,
   increasing a touchdown velocity of said legged robot's swing leg relative to its nominal swing trajectory,
   displacing said toe of said legged robot from said ground before a sufficient ground reaction force is measured to cross an existing threshold,
   classifying a swing and stance phase time according to said sensed characteristics,
   reducing sensitivity of a system to contact detection errors,
   impacting said ground harder than nominal in a vertical direction at a normal component of a relative velocity between said legged robot's toe and the ground simultaneously; and
   exerting swing forces of said toe in contact with said ground inversely proportional to its contact velocity.

2. The method according to claim 1, wherein assumptions made in an execution of a stance control algorithm is applied according to said characteristics of said granular media.

3. The method according to claim 1, wherein said soft and deformable surface includes deep sand, loose gravel, shifting rocks, and silt.

4. The method according to claim 1, wherein said legged robot comprises of a joint enabling extension.

* * * * *